Figure 1:
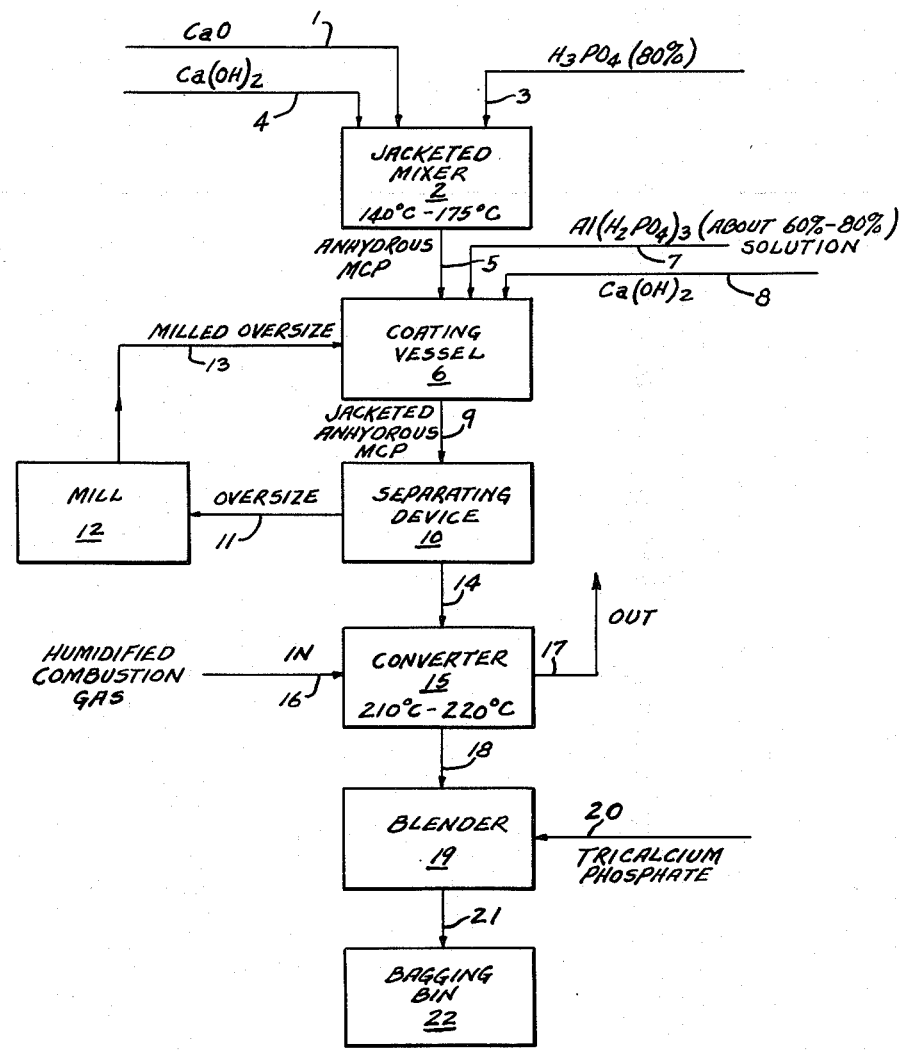

March 10, 1953     F. E. HUBBARD ET AL     2,631,102
MONOCALCIUM PHOSPHATE LEAVENING COMPOSITION
AND METHOD OF PRODUCING SAME
Filed June 1, 1951     2 SHEETS—SHEET 1

INVENTOR.
FINDLEY E. HUBBARD
JOE S. METCALF
BY
Elmer P. Rucker
ATTORNEY

Patented Mar. 10, 1953

2,631,102

UNITED STATES PATENT OFFICE 2,631,102

MONOCALCIUM PHOSPHATE LEAVENING COMPOSITION AND METHOD OF PRODUCING SAME

Findley E. Hubbard and Joe S. Metcalf, Anniston, Ala., assignors to Monsanto Chemical Company, St. Louis, Mo., a corporation of Delaware Application June 1, 1951, Serial No. 229,408

13 Claims. (Cl. 99—95)

This invention is directed to an improved monocalcium phosphate leavening composition and a method of producing same.

Monocalcium phosphate has been employed as a leavening and baking acid for many years. In its hydrated form, it has a rapid solution rate and reacts rapidly with alkaline bicarbonates to liberate carbon dioxide which performs the leavening function during the baking operation. In its pure anhydrous form, its reaction rate is somewhat retarded but is still too rapid to be commercially attractive.

Heretofore, it has been the practice to control the reaction rate of monocalcium phosphate by coating same with a protective film of various organic and inorganic substances which slow down the reaction between it and bicarbonates when they are reacted together in moist or wet dough. Thus, in prior patents, it has been proposed to utilize relatively impure phosphoric acid in the production of anhydrous monocalcium phosphate as it was observed that the alkali metal oxide impurities present in the acid were of such nature as to form glassy or vitreous coatings upon the individual crystals. The above coatings imparted to the crystals increased resistance to moisture absorption and improved properties over the hydrated form from the standpoint of primary and secondary reaction rates. It has also been proposed in Patent 2,291,609 to Cobbs and Hochwalt to produce a coated product by reacting lime with phosphoric acid containing dissolved alumina, an acid soluble aluminum salt or compound; humidifying the resulting product to effect hydrolysis of the associated aluminum phosphates to more basic phosphates and then heating the material to produce a relatively insoluble crystalline phosphate coating by dehydrating the previously formed hydrolysis products. The product produced by this process was somewhat deficient in stability by reason of the fact that it was impossible to obtain as complete a coating upon the crystals as was desired.

An object of the present invention is to provide a method of producing a coated anhydrous monocalcium phosphate leavening agent, which constitutes a substantial improvement over the method disclosed and claimed in the above patent to Cobbs and Hochwalt.

Another object of the invention is to provide an anhydrous monocalcium phosphate leavening agent having an after applied protective coating which consists essentially of aluminum pyrophosphate, dicalcium phosphate and a relatively small amount of monocalcium phosphate.

A further object of the invention is to provide a product of the foregoing type which not only possesses substantial stability to rehydration but also has excellent delayed or reserve leavening properties.

Other objects and advantages will appear as the description of the invention unfolds.

In accordance with the instant invention lime or a lime base is reacted with phosphoric acid to produce anhydrous monocalcium phosphate crystals which are mixed with a hot previously prepared solution of monoaluminum orthophosphate until they are well coated with the above salt. Additional lime is then added and reacted with the coating of mono-aluminum phosphate to produce a jacket around the crystals which has a calculated composition corresponding to a product consisting essentially of dialuminum orthophosphate, dicalcium phosphate and a relatively small amount of monocalcium phosphate. However, an X-ray analysis of the reaction product of mono-aluminum orthophosphate and lime does not show the lines characteristic of the above compounds and apparently a complex mixed salt, that is, a calcium aluminum phosphate, is produced which on heating forms crystalline tetra-aluminum pyrophosphate, dicalcium phosphate and monocalcium phosphate.

The jacketed crystals of monocalcium phosphate are then raised from room temperature up to about 210° C. in a period of about 3 hours whereupon they are maintained for about 4 hours at 210° C.–220° C. in an atmosphere containing about 3% to about 30%, and preferably about 10% to about 20% by volume of water vapor. In this heat treatment, the complex calcium aluminum phosphate of the jacket is converted into a mixture consisting essentially of crystalline tetra-aluminum pyrophosphate, dicalcium phosphate and monocalcium phosphate. The pyrophosphate in the jacket constitutes about 3% to 12% of the entire weight of the final product. The products produced by the method of the instant invention are characterized by the following analyses and properties:

| | |
|---|---|
| Percent CaO | 22.5–23.5 |
| Percent $P_2O_5$ | 59.0–60.5 |
| Neutralization value | 80.0–94.0 |
| Ignition loss | 14.0–15.0 |
| Primary reaction rate | 16.0–25.0 |
| Secondary reaction rate—percent $CO_2$ at 27° C | 45.0–54.0 |
| Humectant, percent gain after 20 hrs. at 30° C. and 75% R. H | 0.10–1.84 |
| Humectant primary reaction rate | 18.0–30.0 |
| Humectant secondary reaction rate | 44.0–52.0 |

Sifting percent:
| | |
|---|---|
| R 48 | |
| CR 80 | |
| CR 115 | 0.0– 0.2 |
| CR 150 | 0.0– 1.0 |
| CR 200 | 0.0–10.0 |
| CR 270 | |
| CR 325 | 10.0–30.0 |
| S 325 | 70.0–90.0 |

By first preparing the anhydrous crystals, then applying thereto a previously prepared hot solution of mono-aluminum orthophosphate and treating the resulting coated product in the above described manner, a more complete coating on the crystals is obtained than was possible by the Cobbs and Hochwalt process and, therefore, a product of improved stability is thereby produced.

Figure 2:
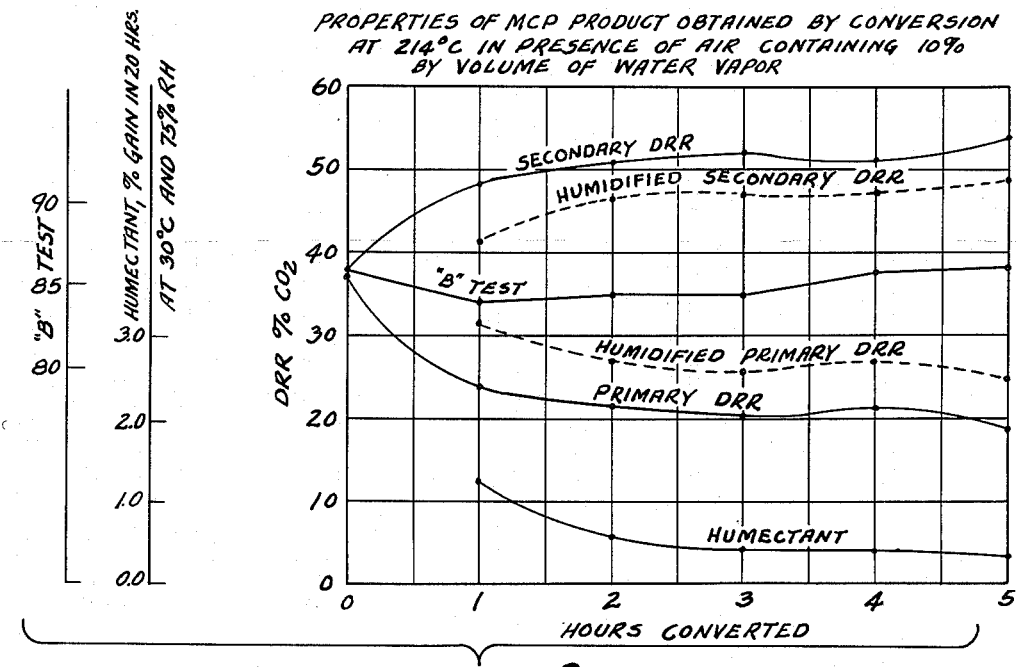
Figure 3:
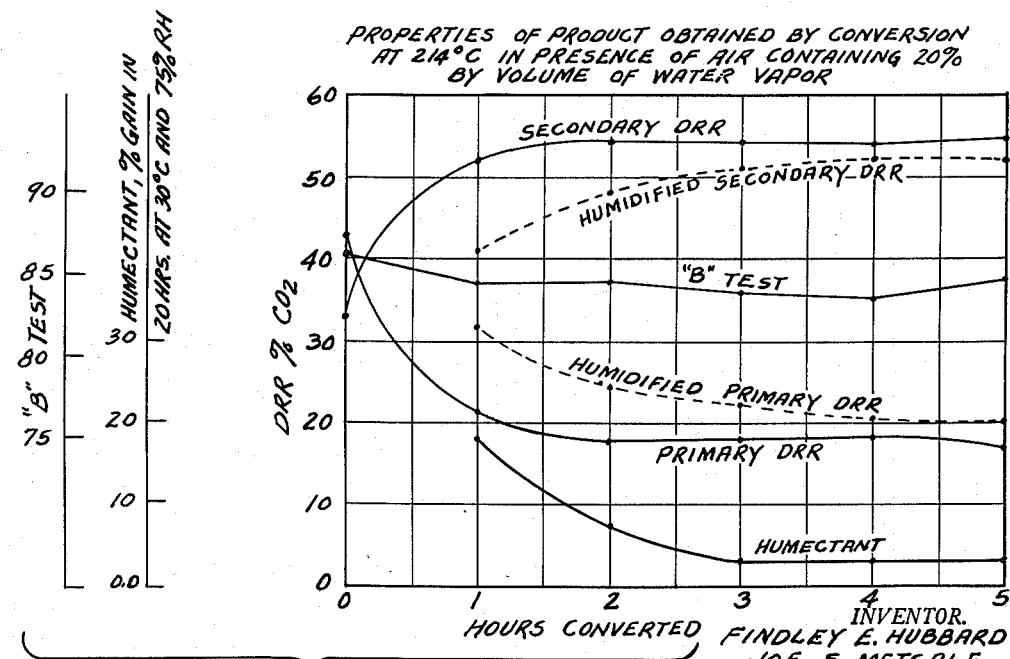

For a more complete understanding of the present invention, reference is made to the accompanying drawings in which Figure 1 is a flow sheet of a preferred embodiment of our new method of making a monocalcium phosphate leavening composition and Figures 2 and 3 are graphical illustrations of the properties of typical products prepared in accordance with the above method.

In accordance with the flow sheet of Figure 1, a substantial amount of quick lime is introduced by line 1 into a steam-jacketed mixer 2, whereupon 80% phosphoric acid is added, with mixing, via line 3 at a rate maintaining the reaction temperature within the range of about 140° C. to about 175° C. Additional lime is added and the mixing continued until an analysis of the product shows about 0% to not more than 4% $P_2O_5$ as free acid. This is followed by the addition of hydrated lime through line 4 in an amount calculated to neutralize the free acid and produce anhydrous monocalcium phosphate containing about 0% to about 5% and preferably not more than about 2% of dicalcium phosphate.

The anhydrous monocalcium phosphate produced in the above-described manner is conveyed by line 5 into a coating vessel 6 where the crystals are thoroughly and uniformly mixed with a boiling solution containing about 60% to about 80% and preferably about 70% by weight of mono-aluminum phosphate which is introduced by line 7. The coated product is then treated with hydrated lime which is charged by way of line 8, this material being used in an amount slightly less than that theoretically required to bring about the following reaction:

$$2Al(H_2PO_4)_3 + 3Ca(OH)_2 \rightarrow Al_2(HPO_4)_3 + 3CaHPO_4 + 6H_2O$$

As a result of the above treatment, the principal reaction proceeds in accordance with the above equation, but since the hydrated lime is employed in less than the above indicated stoichiometric amount, the following reaction also takes place:

$$4Al(H_2PO_4)_3 + 3Ca(OH)_2 \rightarrow 2Al_2(HPO_4)_3 + 3Ca(H_2PO_4)_2 + 6H_2O$$

The above operations result in the formation of a complex calcium aluminum phosphate jacket corresponding in composition to a product consisting essentially of dialuminum orthophosphate, dicalcium phosphate and a relatively small amount of monocalcium phosphate in which these compounds are theoretically present in substantially the proportions hereinafter indicated.

| | Percent by weight |
|---|---|
| Dialuminum orthophosphate | 30–50 |
| Dicalcium phosphate | 25–45 |
| Monocalcium phosphate | 5–25 |

As a modification of the foregoing operations, the above reaction and coating steps may be carried out successively in the same mixing vessel.

The jacketed product is sent by line 9 to a separating device 10 where the oversize (particles over 150 mesh) is removed by screening. The separated oversize is then conveyed by line 11 to mill 12, ground and returned by line 13 to the coating vessel 6 for use as raw material in the production of additional quantities of jacketed monocalcium phosphate. Alternatively, the milled oversize may be recycled to the jacketed mixer 2 for reuse in the process.

The screenings (through 150 mesh) pass by line 14 to a suitable converter 15 such as a Proctor & Schwartz gas fired oven. In the converter, the screenings are heated to a temperature of about 210° C. in 3 hours and then maintained at 210° C. to 220° C. for about 4 hours in an atmosphere of from 10% to 20% by volume of water vapor. The water vapor for this purpose is supplied along with the combustion gases which enter the converter by line 16 and leave by line 17. In the foregoing heat treatment, the complex calcium aluminum phosphate in the jacket is converted to crystalline tetra aluminum pyrophosphate, dicalcium phosphate and monocalcium phosphate. The pyrophosphate in the jacket constitutes about 6%–7% of the entire weight of the final product.

The converted product is conducted by line 18 to a blender 19 where it is thoroughly mixed with about 0.5% tricalcium phosphate which is introduced by line 20. This operation yields a dry, free flowing product which is conveyed by line 21 to a bagging bin 22 from which it is packed into bags or other suitable containers.

The invention is further illustrated but not limited by the following example.

*Example*

11.6 lbs. of −4+40 mesh quick lime (95.7% CaO) was introduced into a steam jacketed Baker-Perkins mixer and the solids heated to a temperature of approximately 105° C. To the heated quick lime there was added 113.7 lbs. of 80.6% $H_3PO_4$ at 92° C. in a period of 1 minute.

This resulted in a violent reaction which was allowed to proceed for 2 minutes, whereupon 8.74 lbs. of milled quick lime (96% CaO) was charged over a period of 7 minutes. During this period the reaction temperature increased from 140° C. to 151° C.

After mixing 5 minutes, 7.10 lbs. of hydrated lime (72.7% CaO) was charged in 7 minutes with the mixer about 85% covered to prevent excessive drying of the mix and thus promote greater reaction between the lime and the acid. During this period, the reaction temperature rose from 144° C. to 153° C.

The mixing was continued for 10 minutes with the mixer completely covered to retain an atmosphere of steam, and a sample of the resulting product was analyzed and found to contain 1.8% $P_2O_5$ as free acid. Then the amount of hydrated lime (2.03 lbs.) calculated to neutralize this acid and form the equivalent of 2% dicalcium phosphate was added over a period of two minutes with mixer 85% closed. After an additional 10 minutes, another sample of the monocalcium phosphate was analyzed and this showed that the product at this point had a neutralizing value of 91.2 and contained 1.92% of dicalcium phosphate.

A 72% mono-aluminum orthophosphate solution (21.2 lbs.) at a temperature of 116° C. and prepared from 3.75 lbs. of hydrated alumina and 17.55 lbs. of 80.6% $H_3PO_4$ was introduced into the mixer in 5 minutes with the cover removed, and then allowed to mix with the anhydrous monocalcium phosphate crystals for 1 minute. During this operation the crystals were wet thoroughly and uniformly with the above solution. Because of the large amounts of water evolved, the mixer temperature fell below 130° but no monohydrated monocalcium phosphate was formed.

Before the mono-aluminum phosphate coating had time to dry out completely, 4.79 lbs. of hydrated lime was added in a period of 4 minutes with the mixer 85% covered. At the end of the addition, the mixer temperature was 130° C. The mix was then held for 10 minutes at this temperature with the mixer covered to promote the reaction between the mono-aluminum orthophosphate and the lime. After effecting substantially complete reaction between the mono-aluminum orthophosphate and the lime, the mixer cover was removed for 10 minutes to allow the escape of water vapor from the mixer.

The product obtained by the above operations had the following properties:

| | Per cent |
|---|---|
| Ignition loss at 850° C. | 16.24 |
| +80 mesh | 26.5 |
| Free acid | 0.5 |
| Free acid after cooling | 0.13 |

Two samples of the above product which passed a 150 mesh screen were heated at a temperature of 214° C. for 1-5 hours in a gas fired rotary converter and in the presence of air containing 10% and 20% by volume of water vapor. Products having the following properties were obtained.

*Product obtained by conversion at 214° C. in the presence of air containing 10% by volume of water vapor*

| Hours At Temp. | Percent Ign. Loss | Neut. Value | D. R. R., Percent $CO_2$ | | Humectant | | Humectant D. R. R. | |
|---|---|---|---|---|---|---|---|---|
| | | | Pri. | Sec. | Hours' Exposure | Percent Gain in Wt. | Pri. | Sec. |
| 0 | 15.14 | 86.0 | 37.3 | 38.1 | | | | |
| 1 | | 84.0 | 24.1 | 48.1 | 20 | 1.26 | 31.6 | 41.2 |
| 2 | 14.85 | 84.5 | 21.8 | 50.7 | 20 | 0.52 | 26.6 | 46.2 |
| 3 | | 84.4 | 20.4 | 52.3 | 20 | 0.42 | 25.6 | 46.6 |
| 4 | | 85.9 | 21.3 | 51.4 | 20 | 0.38 | 26.2 | 47.3 |
| 5 | 14.72 | 86.0 | 18.8 | 53.9 | 20 | 0.32 | 24.8 | 48.7 |

*Product obtained by conversion at 214° C. in the presence of air containing 20% by volume of water vapor*

| Hours At Temp. | Percent Ign. Loss | Neut. Value | D. R. R., Percent $CO_2$ | | Humectant | | Humectant D. R. R. | |
|---|---|---|---|---|---|---|---|---|
| | | | Pri. | Sec. | Hours' Exposure | Percent Gain in Wt. | Pri. | Sec. |
| 0 | 15.11 | 86.4 | 42.5 | 33.4 | | 0 | | |
| 1 | | 84.6 | 21.2 | 52.3 | 20 | 1.84 | 32.1 | 40.8 |
| 2 | 14.80 | 84.9 | 18.1 | 54.3 | 20 | 0.74 | 24.4 | 48.0 |
| 3 | | 83.9 | 18.1 | 54.3 | 20 | 0.34 | 22.3 | 50.7 |
| 4 | | 83.8 | 18.3 | 54.0 | 20 | 0.32 | 20.4 | 52.0 |
| 5 | 14.71 | 84.9 | 17.4 | 54.6 | 20 | 0.28 | 20.4 | 52.0 |

The above values (except ignition loss) are graphically illustrated in Figures 2 and 3 of the accompanying drawings. It is evident therefrom that the above products have excellent properties from the standpoint of neutralizing value, primary reaction rate, secondary reaction rate and stability to rehydration The slow and relatively uniform reaction rate of the products of the instant invention renders them eminently suitable for use in the baking of biscuits, cakes, waffles, etc. Thus, the slow evolution of carbon dioxide during the first two minutes of the dough mixing permits a thorough mixing of the dough or batter without excessive loss of the above gas during this period and consequently a high percentage of the leavening capacity of the monocalcium phosphate is reserved for the baking stage.

Moreover, the slow reaction rate and stability of the above products against rehydration adapt them for use in the finely divided state as a component of baking powders. For example, they may be employed in particle sizes of less than 200 mesh, or even less than 325 mesh, in admixture with sodium bicarbonate to provide a baking powder of excellent keeping properties.

In addition, the slow reaction rate and stability of the above products against rehydration render them highly advantageous for use in self-rising flours which are particularly severe on leavening agents due to their high content of moisture.

The following experimental data further illustrate the properties of a typical product of the instant invention when employed in a self-rising flour consisting essentially of 100 parts of flour, 1.09-1.15 parts of sodium bicarbonate and 1.5 parts of monocalcium phosphate.

TABLE I

*Baking scores—Warm moist flour tests carried out at about 90° F.*

|  | 0 Minute Delayed Baking | 2 Minute Delayed Baking |
|---|---|---|
| 1 Day Storage: | | |
| Wt. of Dough_____grams__ | 25.6 | 21.7 |
| Wt. of Biscuit_____do____ | 22.3 | 19.0 |
| Actual Volume of Biscuits_____cc___ | 63.8 | 54.4 |
| Specific Volume [1] of Biscuits_____ | 2.86 | 2.86 |
| Total Score [2] of Biscuits_____ | 100.4 | 94.9 |
| Biscuit pH_____ | 6.98 | 6.92 |
| Moisture Content of Flour_____percent__ | 13.4 | 13.4 |
| Percent Soda_____ | 1.15 | 1.15 |
| Primary Dough Reaction Rate_____percent | 21.7 | 21.7 |
| Secondary Dough Reaction Rate_____do____ | 43.9 | 43.9 |
| 7 Days' Storage: | | |
| Wt. of Dough_____grams__ | 25.4 | 22.3 |
| Wt. of Biscuit_____do____ | 22.6 | 19.5 |
| Actual Volume of Biscuits_____cc___ | 61.9 | 53.0 |
| Specific Volume [1] of Biscuits_____ | 2.74 | 2.72 |
| Total Score [2] of Biscuits_____ | 98.8 | 94.0 |
| Biscuit pH_____ | 6.91 | |
| Moisture Content of Flour_____percent__ | 13.6 | 13.6 |
| Percent Soda in Flour_____ | 1.13 | 1.13 |
| Primary Reaction Rate_____percent__ | 24.5 | 24.5 |
| Secondary Reaction Rate_____do____ | 40.9 | 40.9 |
| 13 Days' Storage: | | |
| Wt. of Dough_____grams__ | 25.3 | 22.5 |
| Wt. of Biscuit_____do____ | 21.9 | 19.4 |
| Actual Volume of Biscuits_____cc___ | 65.0 | 52.8 |
| Specific Volume [1] of Biscuits_____ | 2.97 | 2.73 |
| Total Score [2] of Biscuits_____ | 99.5 | 94.1 |
| Biscuit pH_____ | 7.0 | |
| Percent Moisture Content of Flour_____ | 13.3 | 13.3 |
| Percent Soda in Flour_____ | 1.09 | 1.09 |
| Primary Dough Reaction Rate_____percent__ | 27.3 | 27.3 |
| Secondary Dough Reaction Rate_____do____ | 38.7 | 38.7 |
| 30 Days' Storage: | | |
| Wt. of Dough_____grams__ | 24.9 | 24.4 |
| Wt. of Biscuit_____do____ | 20.9 | 19.7 |
| Actual Volume of Biscuits_____cc___ | 61.9 | 50.6 |
| Specific Volume [1] of Biscuits_____ | 2.95 | 2.60 |
| Total Score [2] of Biscuits_____ | 94.3 | 89.3 |
| Biscuit pH_____ | 6.98 | |
| Percent Moisture Content of Flour_____ | 13.2 | 13.2 |
| Percent Soda in Flour_____ | 1.09 | 1.09 |
| Primary Dough Reaction Rate_____percent__ | 29.6 | 29.6 |
| Secondary Dough Reaction Rate_____do____ | 34.9 | 34.9 |

[1] The specific volume is indicative of the lightness of the baked biscuit; it is defined by the following relationship:

$$\text{Specific volume} = \frac{\text{actual volume of baked biscuit}}{\text{weight of baked biscuit}}$$

[2] In arriving at the above scores for the baked biscuits, the following characteristics were considered:

|  |  | Characteristics Affecting Score | |
|---|---|---|---|
|  |  | Favorable | Unfavorable |
| pH (Leavening Balance) External appearance_____ | 12 | Symmetrical, regular straight and even side wall. | Rough, cracked, uneven, flat. |
| Texture (of crumb)_____ | 13 | Uniform, flaky, open thin cell wall, silky. | Coarse, light, grainy, close, crumbly. |
| Tenderness_____ | 15 | Short, friable. | Tough, dry weak, chewy. |
| Flavor_____ | 15 | Sweet, bland, nutty, neutral. | Flat, strong, rancid, garlic, acid, alkaline-foreign. |
| Color: | | | |
| A—Crust_____ | 10 | Golden brown, bright even. | Dull, dark, pale, mottled. |
| B—Crumb_____ | 15 | White, bright, lively bloom. | Gray, flat, specky yellow. |
| Lightness, specific vol_____ | 10 | | |
| Volume, actual_____ | 10 | | |
| Total_____ | 100 | | |
| Penalty_____ | | | Excess acidity or alkalinity, garlicky, rancid, foreign contamination. |
| Net Score_____ | 100 | | |

The data hereinafter presented illustrate the properties of spray dried monocalcium phosphate monohydrate when employed with a self-rising flour of the same composition but containing 1.42 parts of soda.

TABLE II

|  | 0 Minute Delayed Baking | 2 Minute Delayed Baking |
| --- | --- | --- |
| Wt of Dough | 23.0 grams | 22.8 grams. |
| Wt. of Biscuit | 19.8 grams | 19.7 grams. |
| Actual Volume of Biscuits | 40.3 | 45.6. |
| Specific Volume of Biscuits | 2.44 | 2.31. |
| Total Score of Biscuits | 88.9 | 86.0. |
| Biscuit pH | 7.0 | 7.0. |
| Moisture Content of Flour | About 10.5% | About 10.5%. |
| Percent Soda | 1.42 | 1.42. |
| Primary Dough Reaction Rate | 52.7 | 52.7. |
| Secondary Dough Reaction Rate | 18.9 | 18.9. |

As indicated above, the flour mixes in one test (Table I) were stored at 90° F. in bags for the specified period of time, then immediately made into dough, rolled out, cut into biscuits and baked. In the other test (Table I), the mixtures were similarly treated except that the dough was allowed to stand two minutes, before being rolled out, cut into biscuits and baked.

The data in Table II set forth the properties of self-rising flour containing hydrated monocalcium phosphate and baked biscuits prepared therefrom so that they can be compared with the products containing the monocalcium phosphate of the instant invention. The storage test data are not included since it would not be expected that any appreciable change would take place on the storage of self-rising flour containing hydrated monocalcium phosphate since the latter cannot be further hydrated.

The experimental data in the above tables demonstrate that the monocalcium phosphate of the instant invention has very favorable properties from the standpoint of primary and secondary reaction rates, as compared with hydrated monocalcium phosphate, and that these properties result in the production of larger and lighter biscuits having improved characteristics as evidenced from their higher total scores. Moreover, the above experimental data (Table I) demonstrate that the product of the present invention is quite stable to the normal deleterious effect of hydration since, after storage for 30 days under rather severe conditions, the primary and secondary reaction rates had changed only 8% and 9% respectively.

The various conditions of operation will now be considered in detail.

In carrying the instant invention into execution, lime and phosphoric acid are mixed and reacted together at a temperature of about 140° C. to about 175° C. to form crystalline anhydrous monocalcium phosphate. In this reaction, lime may be employed in an amount sufficient to produce up to 10% by weight of dicalcium phosphate in the product, but less than 5% is preferred as larger amounts reduce the neutralization value of the monocalcium phosphate to an undesirable degree.

The above reaction is desirably initiated with quick lime and then completed with hydrated lime. In executing the initial reaction, the quick lime and phosphoric acid are proportioned so as to produce anhydrous monocalcium phosphate containing about 0% to about 10%, and preferably about 0% to not more than 4% by weight of phosphorus pentoxide as free acid. Then, there is introduced, with mixing, hydrated lime in an amount sufficient to neutralize the free acid and also produce the above indicated quantities of dicalcium phosphate. If desired, the initial reaction may be carried out using quick lime and then hydrated lime to yield monocalcium phosphate containing up to 10% by weight of phosphorus pentoxide as free acid. Thereupon, the final adjustment with hydrated lime may be made in the manner described above.

After the above operations have been completed, a boiling 60%-80% aqueous solution of mono-aluminum orthophosphate is thoroughly mixed with the crystals of anhydrous monocalcium phosphate so as to provide the latter with a uniform coating of the above salt. The mono-aluminum orthophosphate solution is used in an amount sufficient to supply about 0.5% to about 4%, and preferably about 2% by weight of aluminum oxide in the final product. Expressed in a somewhat different manner, the above solution is employed in an amount providing, on conversion, about 3% to about 12%, or more specifically, about 6% to about 7% by weight of tetra-aluminum pyrophosphate in the final product. Larger amounts of the solution may be employed, but this is undesirable since it will unduly lower the neutralization value of the monocalcium phosphate.

The addition of the mono-aluminum orthophosphate solution, which contains from 20% to 40% free water, causes a lowering of the mixer temperature to about 120° C. and under these conditions substantial hydration of the monocalcium phosphate would be expected. However, contrary to expectations, no appreciable amount of hydration occurs.

As soon as the anhydrous monocalcium phosphate crystals have been well coated with mono-aluminum phosphate, hydrated lime is added in an amount sufficient to convert the coating upon the individual crystals into a crystalline jacket corresponding in composition to a product consisting essentially of dialuminum orthophosphate and monocalcium phosphate; dialuminum orthophosphate, dicalcium phosphate and monocalcium phosphate; or dialuminum orthophosphate and dicalcium phosphate. However, it is preferred to add hydrated lime in the amount required to convert the coating into a crystalline jacket corresponding in composition to a product consisting essentially of about 30% to 50% by weight of dialuminum orthophosphate, about 25% to 45% by weight of dicalcium phosphate and about 5% to 25% by weight of monocalcium phosphate. During the above addition, the wet and sticky crystals become dry and free flowing.

Although the conversion of the mono-aluminum orthophosphate to dialuminum orthophosphate is preferably accomplished by means of hydrated lime, it is obvious that this may be achieved with equivalent quantities of the oxides and hydroxides of magnesium and aluminum, in which case the jacket will contain tetra-aluminum pyrophosphate and the corresponding mono- and/or di-orthophosphates of magnesium and aluminum.

More particularly, when using the oxide or hydroxide of aluminum, it should be reacted with the mono-aluminum phosphate coating in an amount equivalent to 0.5 to 1.0 mole of $Al(OH_3)_3$ to 1 mole of $Al(H_2PO_4)_3$ as called for by the following equation:

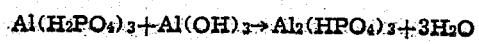

Broadly stated, the reaction of the mono-aluminum orthophosphate coating with a compound selected from the group consisting of the oxides and hydroxides of calcium, magnesium and aluminum results in the production of a complex aluminum phosphate jacket corresponding in composition to a product consisting essentially of dialuminum orthophosphate and at least one metallic hydrogen orthophosphate corresponding to the metals of the above group.

The jacketed product in the above manner usually contains about 10%–30% by weight of oversize having a particle size of plus 150 mesh. This oversize is removed by screening, milled and returned to the coating or reaction step of the method for use in the production of further quantities of jacketed monocalcium phosphate. The following are typical screen analyses of the milled oversize.

R 80------------------ 1.7    0.8    0.5
CR 150---------------- 11.4   8.5    6.5
CR 200---------------- 19.0   16.3   13.7
CR 325---------------- 30.8   29.1   27.4
S 325----------------- 69.2   70.9   72.6

The screenings (minus 150 mesh) are heated in the presence of from about 3% to about 30% by volume of water vapor at a temperature and for a period of time sufficient to convert the calcium aluminum phosphate of the jacketed monocalcium phosphate into tetra-aluminum pyrophosphate, dicalcium phosphate and monocalcium phosphate but insufficient to effect substantial conversion of the monocalcium phosphate to the pyrophosphate stage. More particularly, the screenings are heated under the following conditions to bring about the above conversion.

| Percent by Volume of Water Vapor | Temperature, °C. | Time, Hours |
|---|---|---|
| 3–30 | 200–230 | 2–4.5 |
| 10–20 | 210–220 | 3–4 |

Where the oxide or hydroxide of magnesium is used in converting the mono-aluminum orthophosphate coating into a crystalline magnesium aluminum phosphate jacket corresponding in composition to dialuminum orthophosphate, dimagnesium and/or monomagnesium orthophosphate, calcination under the above conditions yields a protective coating consisting essentially of tetra-aluminum pyrophosphate and the above magnesium salts in a substantially unchanged condition. Where the oxide or hydroxide of aluminum is substituted for hydrated lime, calcination results in the production of a protective coating consisting essentially of tetra-aluminum pyrophosphate and relatively small amounts of aluminum acid pyrophosphate.

Upon completing the above conversion, the resulting product is blended with about 0.5% to about 2% by weight of tricalcium phosphate to yield a dry free flowing material which is packed into bags or other suitable storage or shipping containers.

In the above conversion, the stated percentage by volume of water vapor includes combustion water, water from dehydration, water from molecular dehydration and added steam.

The products of the instant invention consist of crystals of anhydrous monocalcium phosphate having a substantially complete and continuous coating or jacket consisting of tetra-aluminum pyrophosphate in which dicalcium phosphate and relatively small amounts of monocalcium phosphate are occluded. The anhydrous monocalcium phosphate content of these products is quite stable since it is not completely hydrated after exposure for 48 hours to a relative humidity of 75% at 39° C. As evidence of this, the following results obtained with typical samples of the above products are presented:

*Exposure for 48 hours at 39° C. and 75% R. H.*

| Samples of Products of Instant Invention | Mol $H_2O$ Pickup Per Mol of MCP |
|---|---|
| (a) Sample 1 | 0.27 |
| (b) Sample 2 | 0.24 |

The coating or jacket on the above products is crystalline in character since it is doubly refracting and has a distinctive X-ray pattern. Moreover, it has the unique property of so sequestering the atmospheric moisture from the anhydrous monocalcium phosphate that the primary and secondary dough reaction rates of the coated products are not greatly affected even after substantial amounts of moisture have been absorbed in the coating. Finally, the coating is relatively insoluble in 0.85% $H_3PO_4$ and may be separated substantially intact from the anhydrous core of monocalcium phosphate by leaching with dilute $H_3PO_4$ at a constant pH of 3.3 the coated products for a period of about 6 to 24 minutes.

The expression "neutralizing value" or "B Test" as used herein is the number of parts of sodium bicarbonate required to neutralize 100 parts by weight of monocalcium phosphate.

The percentage humectant is determined by evenly distributing a five gram sample of the product over the surface of a flat Pyrex dish having a diameter of 75 mm., placing said sample in a forced draft oven maintained at 30° C. and 75% relative humidity for 20 hours and then weighing the product. From the original and final weights of the sample, the percentage gain in weight or percentage humectant is calculated from the following equation:

$$\text{Percent humectant} = \frac{\text{Gain in weight} \times 100}{5}$$

The primary reaction rate is the amount of carbon dioxide generated in the first two minutes by reaction at 27° C. in dough of the monocalcium phosphate product with a quantity of sodium bicarbonate capable of liberating 200 cc. of $CO_2$. The secondary reaction rate is the amount of $CO_2$ liberated in the next 8 minutes.

The humectant primary and secondary reaction rates are similar to those given in the preceding paragraph except that the rates are determined after the products have been subjected to a relative humidity of 75% at 30° C. for 20 hours.

While we have described our invention in detail, it should be understood that many changes may be made therein without departing from spirit of same.

Having thus described our invention what we claim as new and desire to secure by Letters Patent is:

1. The method of producing a slow-acting monocalcium phosphate, which comprises reacting lime with phosphoric acid under conditions yielding anhydrous monocalcium phosphate, applying to said anhydrous product a hot aqueous solution of mono-aluminum orthophosphate, reacting with said coating a compound selected from the group consisting of the oxides and hydroxides of calcium, magnesium and aluminum to form a complex aluminum phosphate jacket corresponding in composition to a product consisting essentially of dialuminum orthophosphate and a metallic hydrogen orthophosphate corresponding to the metals of said group, and heating said jacketed product at a temperature sufficient to convert said dialuminum orthophosphate to tetra-aluminum pyrophosphate but insufficient to effect substantial conversion of said monocalcium phosphate to the pyrophosphate stage, said conversion being effected in the presence of about 3% to about 30% by volume of water vapor.

2. The method of producing a slow-acting monocalcium phosphate, which comprises reacting lime with phosphoric acid under conditions yielding anhydrous monocalcium phosphate, applying to said anhydrous product a hot aqueous solution of mono-aluminum orthophosphate, reacting lime with said coating to form a complex calcium aluminum phosphate jacket corresponding in composition to a product consisting essentially of dialuminum orthophosphate, dicalcium phosphate and a relatively small amount of monocalcium phosphate, and heating said jacketed product at a temperature sufficient to convert said dialuminum orthophosphate to tetra-aluminum pyrophosphate but insufficient to effect substantial conversion of said monocalcium phosphate to the pyrophosphate state, said conversion being effected in the presence of about 3% to about 30% by volume of water vapor.

3. The method of producing a slow-acting monocalcium phosphate, which comprises reacting lime with phosphoric acid under conditions yielding anhydrous monocalcium phosphate, applying to said anhydrous product a hot aqueous solution of mono-aluminum orthophosphate, reacting lime with the resulting coating to form a complex calcium aluminum phosphate jacket corresponding in composition to a product consisting essentially of dialuminum orthophosphate, dicalcium phosphate and a relatively small amount of monocalcium phosphate and heating said jacketed product at a temperature sufficient to convert said dialuminum orthophosphate to tetra-aluminum pyrophosphate but insufficient to effect substantial conversion of said monocalcium phosphate to the pyrophosphate stage, said conversion being effected in the presence of about 10% to 20% by volume of water vapor.

4. The method of producing a slow-acting monocalcium phosphate, which comprises reacting lime with phosphoric acid under conditions yielding anhydrous monocalcium phosphate, applying to said anhydrous product a hot aqueous solution containing about 60% to about 80% by weight of mono-aluminum orthophosphate, reacting lime with the resulting coating in an amount sufficient to convert said coating into a complex calcium aluminum phosphate jacket corresponding in composition to a product consisting essentially of 30% to 50% by weight of dialuminum orthophosphate, 25% to 45% by weight of dicalcium phosphate and 5% to 25% by weight of monocalcium phosphate, and then heating said jacketed product at a temperature of from 200° C. to 230° C. in the presence of from about 3% to about 30% by volume of water vapor and for a period of time sufficient to effect substantially complete conversion of said dialuminum orthophosphate into tetra-aluminum pyrophosphate, said mono-aluminum orthophosphate being employed in an amount sufficient to supply about 0.5% to about 4% by weight of aluminum oxide in the product.

5. The method of producing a slow-acting monocalcium phosphate, which comprises reacting lime with phosphoric acid under conditions yielding anhydrous monocalcium phosphate, applying to said anhydrous product a hot aqueous solution containing about 72% by weight of mono-aluminum orthophosphate, reacting lime with the resulting coating in an amount sufficient to convert said coating into a complex calcium aluminum phosphate jacket corresponding in composition to a product consisting essentially of 45% by weight of dialuminum orthophosphate, 40% by weight of dicalcium phosphate and 15% by weight of monocalcium phosphate, and then heating said jacketed product at a temperature of from 210° C. to 220° C. in the presence of from 10% to 20% by volume of water vapor and for a period of time sufficient to effect substantially complete conversion of said dialuminum phosphate into tetra-aluminum pyrophosphate, said mono-aluminum orthophosphate being employed in an amount sufficient to supply about 2% by weight of aluminum oxide in the product.

6. The method of producing a slow-acting monocalcium phosphate, which comprises reacting lime with phosphoric acid under conditions yielding anhydrous monocalcium phosphate containing about 0.5% to about 5% by weight of dicalcium phosphate, applying to said anhydrous product a 72% aqueous solution of mono-aluminum orthophosphate at a temperature of about 116° C., reacting lime with the resulting coating in an amount sufficient to convert said coating into a complex calcium aluminum phosphate jacket corresponding in composition to a product consisting essentially of 45% by weight of dialuminum orthophosphate, 40% by weight of dicalcium phosphate and 15% by weight of monocalcium phosphate, and then heating said jacketed product at a temperature of from 210° C. to 220° C. in the presence of from 10% to 20% by volume of water vapor and for a period of time sufficient to effect substantially complete conversion of said dialuminum orthophosphate into tetra-aluminum pyrophosphate, said mono-aluminum phosphate being employed in an amount sufficient to supply about 6% to 7% by weight of tetra-aluminum pyrophosphate in the final product.

7. The method of producing a slow-acting monocalcium phosphate, which comprises reacting lime with phosphoric acid under conditions yielding anhydrous monocalcium phosphate containing up to not more than 4% $P_2O_5$ as free acid, adding hydrated lime in an amount sufficient to neutralize said free acid and produce the equivalent of about 0.5% to 3.6% by weight of dicalcium phosphate, applying to the resulting product a 72% aqueous solution of mono-aluminum orthophosphate at a temperature of about 116° C., reacting lime with the resulting coating in an amount sufficient to convert said coating into a complex calcium aluminum phosphate jacket corresponding in composition to a product consisting essentially of dialuminum orthophosphate, dicalcium phosphate and monocalcium phosphate, and then heating said jacketed product at a temperature of from 210° C. to 220° C.

in the presence of from 10% to 20% by volume of water vapor and for a period of time sufficient to substantially completely convert said dialuminum orthophosphate into tetra-aluminum pyrophosphate, said mono-aluminum phosphate being employed in an amount sufficient to supply about 6% to 7% by weight of tetra-aluminum pyrophosphate in the final product.

8. The method of producing a slow-acting monocalcium phosphate, which comprises reacting lime with phosphoric acid under conditions yielding anhydrous monocalcium phosphate containing up to not more than 4% $P_2O_5$ as free acid, adding hydrated lime in an amount sufficient to neutralize said free acid and produce the equivalent of 2%–3% by weight of dicalcium phosphate, applying to the resulting product a boiling solution containing about 60% to about 80% by weight of mono-aluminum orthophosphate, reacting lime with the resulting coating in an amount sufficient to convert said coating into a complex calcium aluminum phosphate jacket corresponding in composition to a product consisting essentially of dialuminum orthophosphate, dicalcium phosphate and monocalcium phosphate, and then heating said jacketed product at a temperature of from 210° C. to 220° C. in the presence of from 10% to 20% by volume of water vapor and for a period of about 3–4 hours to substantially completely convert said dialuminum orthophosphate into tetra-aluminum pyrophosphate, said mono-aluminum phosphate being employed in an amount sufficient to provide from 3% to 12% by weight of tetra-aluminum pyrophosphate in the final product.

9. The method of producing a slow-acting monocalcium phosphate, which comprises introducing quick-lime and 80% phosphoric acid into a reaction zone, with simultaneous mixing, to form anhydrous monocalcium phosphate containing a relatively small amount of free acid, adding hydrated lime to said anhydrous product in an amount sufficient to neutralize said free acid and produce about 2% by weight of dicalcium phosphate, then mixing a boiling solution containing 72% by weight of mono-aluminum orthophosphate with the neutralized product and thereby coating same with said solution, adding hydrated lime to said coated product in an amount sufficient to convert said coating into a complex calcium aluminum phosphate jacket corresponding in composition to a product consisting essentially of dialuminum orthophosphate, dicalcium phosphate and monocalcium phosphate, screening the product thus obtained through a 150 mesh screen, and then heating the screenings at a temperature of 210° C. to 220° C. for about 4 hours in the presence of 10% to 20% by volume of water vapor to convert said dialuminum orthophosphate into tetra-aluminum pyrophosphate, said mono-aluminum orthophosphate being employed in an amount sufficient to provide about 6% to 7% by weight of tetra-aluminum pyrophosphate in the final product.

10. The method of producing a slow-acting monocalcium phosphate as defined in claim 9 wherein the plus 150 mesh material is milled and returned to the coating step for use in the production of additional amounts of said composition.

11. The method of producing a slow-acting monocalcium phosphate, which comprises introducing quick-lime and 80% $H_3PO_4$ into a mixer containing milled oversize from a previous batch, to form anhydrous monocalcium phosphate containing up to not more than 4% by weight of $P_2O_5$ as free acid, adding hydrated lime to said anhydrous product in an amount sufficient to neutralize said free acid and produce the equivalent of about 2% by weight of dicalcium phosphate, mixing a boiling solution containing mono-aluminum orthophosphate with said neutralized product and thereby coating same with said solution, adding hydrated lime to said coated product in an amount sufficient to convert said coating into a complex calcium aluminum phosphate jacket corresponding in composition to a product consisting essentially of dialuminum orthophosphate, dicalcium phosphate and monocalcium phosphate, screening the resulting product through a 150 mesh screen, and then heating the screenings at a temperature of 210° C. to 220° C. for about 4 hours in the presence of 10% to 20% by volume of water vapor to convert said dialuminum orthophosphate into tetra-aluminum pyrophosphate, said mono-aluminum orthophosphate being employed in an amount sufficient to provide about 6% to about 7% by weight of tetra-aluminum pyrophosphate in the final product.

12. The method of producing a slow-acting monocalcium phosphate as defined in claim 11 wherein the plus 150 mesh material is milled and returned for reuse in the initial step of the method.

13. A slow-acting monocalcium phosphate produced by the method defined in claim 1.

FINDLEY E. HUBBARD.
JOE S. METCALF.

REFERENCES CITED

The following references are of record in the file of this patent:

UNITED STATES PATENTS

| Number | Name | Date |
|---|---|---|
| 2,291,608 | Cobb et al. | Aug. 4, 1942 |
| 2,297,630 | Milligan | Sept. 29, 1942 |